July 31, 1951 — P. ALTMAN — 2,562,405
DEHUMIDIFYING APPARATUS
Filed Aug. 19, 1948 — 2 Sheets-Sheet 1

INVENTOR.
PETER ALTMAN
BY Hawks & Hardesty
ATTORNEYS

July 31, 1951 — P. ALTMAN — 2,562,405
DEHUMIDIFYING APPARATUS
Filed Aug. 19, 1948 — 2 Sheets-Sheet 2

INVENTOR.
PETER ALTMAN
BY Hauke & Hardesty
ATTORNEYS

Patented July 31, 1951

2,562,405

UNITED STATES PATENT OFFICE 2,562,405

DEHUMIDIFYING APPARATUS

Peter Altman, Detroit, Mich., assignor to Continental Motors Corporation, Detroit, Mich., a corporation of Virginia Application August 19, 1948, Serial No. 45,130

13 Claims. (Cl. 34—35)

My invention relates to a dehumidifying apparatus and to a method of operation for supplying an adequate amount of heated air to a storage facility for hay or other similar produce, and more particularly to an apparatus utilizing engine heat for heating the air.

It is recognized that the use of heated air is desirable and beneficial in the drying of hay and other feeds or produce, because it permits loading the hay in a bin or other enclosure under relatively wet conditions such as 40–45 percent moisture content, and allows the drying of this hay without spoilage. This results in hay of a high carotin content and a higher nutritive value, as has been demonstrated by actual feeding tests.

The use of heated air is not new, as it has been the custom heretofore to provide auxiliary heating units to heat the air as same is being conducted to the hay storage facility. Such added heating units are at present a fire hazard, and cannot be used excepting when an operator is in constant attendance, and a careful watch must be maintained over the whole operation.

It is an object of my present invention to overcome the aforesaid difficulties as encountered with the use of auxiliary heating equipment, by utilizing the heat generated by an internal combustion engine used to drive the blower which circulates the air through said crop storage facility.

In general, the ordinary type of storage bin or other storage facility requires about a maximum of 7½ horsepower to drive a fan of sufficient size for the circulating of air. This amount of power, however, does not result in sufficient heat for drying under all conditions. Consequently, it is necessary to have a greater amount of heat and in the present invention, this is all obtained from the internal combustion engine driving the fan or blower instead of using auxiliary or supplementary heaters with their attending hazards and operating difficulties.

To obtain the necessary additional heat in my present system as described herein, I artificially increase the back pressure on the fan or blower, and consequently there is required a greater amount of power to operate the fan or blower.

Experience has shown that one can increase the power required from about seven to twenty-five horsepower with the use of only a 36″ tube axial fan, and thus make available about three and a half times as much heat compared to the heat generated by such an engine when operating against no artificial back pressure. All this extra power shows up as useful heat in the circulating system because the engine and the exhaust system are both placed in the path of the incoming air, and this heated air is carried into the air ducts leading to the crop storage facility. It has been possible to recover substantially all of the heat dissipated by said engine.

For a more detailed understanding of my invention reference may be had to the accompanying drawings illustrating a preferred embodiment of my invention in which like parts are referred to by like characters throughout the several views, and in which Fig. 1 is a diagrammatic view showing my whole system and embodying the principles of my invention.

Figures 1, 2, 5:
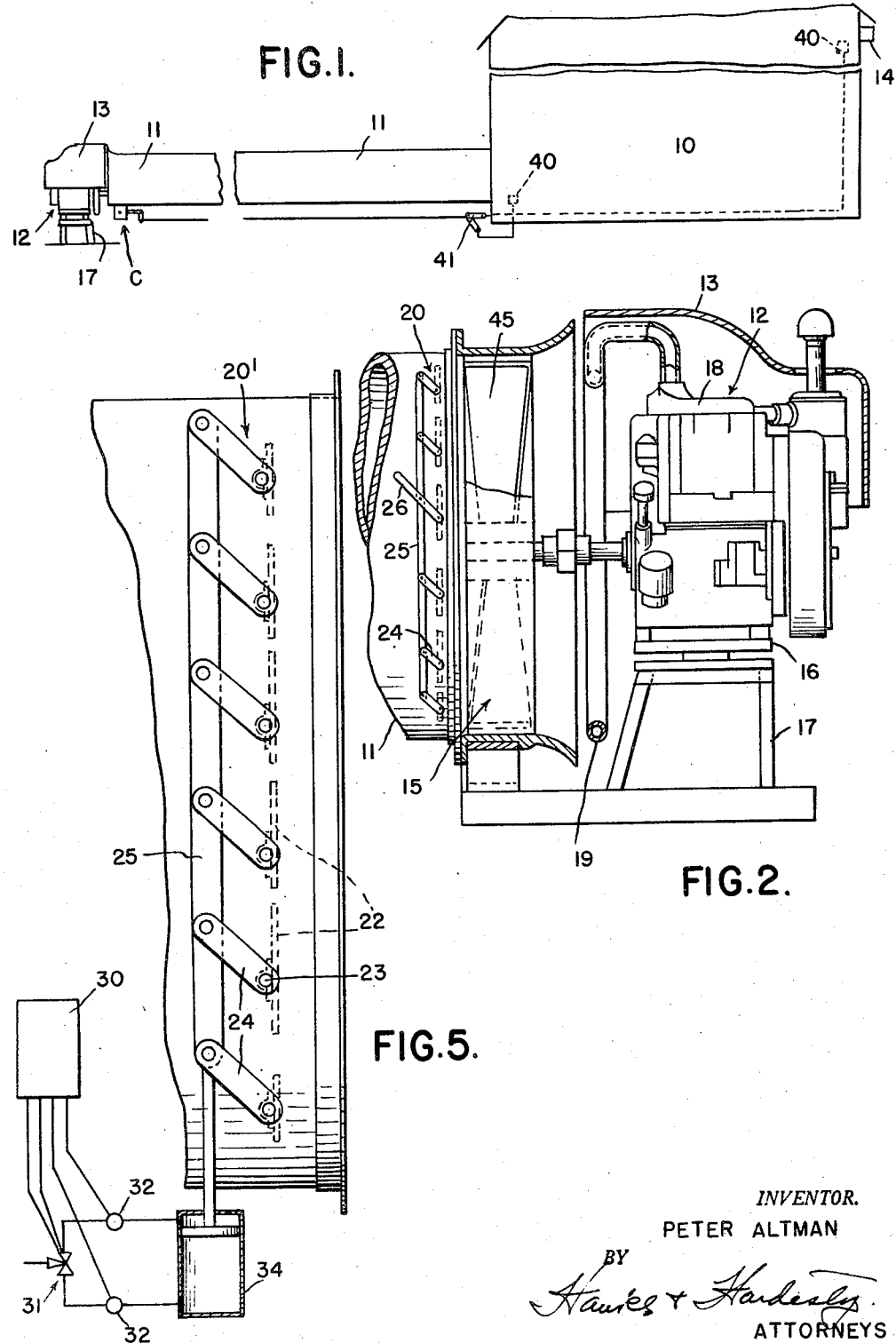
Fig. 2 is a view of the engine and adjacent parts, partly in section.
Fig. 5 is a side elevational view of a vane structure showing an automatic control therefor.

My present invention is preferably shown in connection with apparatus for drying hay or other leguminous feeds or farm produce, and in Fig. 1, I have diagrammatically illustrated a storage facility such as a bin or barn 10, an air duct 11 leading to said storage facility and an internal combustion engine 12 provided with suitable cowling 13 for directing air flow over said engine. The barn or other enclosure is provided with a suitable air outlet 14.

A tube axial blower or fan 15 is housed in the conduit or air duct 11, preferably adjacent the inlet end and adjacent to said engine 12. This engine 12 is mounted on a base 16 and rotatably supported on the stand 17, and is provided with exhaust manifold means 18 connected with an exhaust ring or pipe 19, which is preferably positioned at the mouth of the air duct 11 (see Fig. 2) and transversely extended across the air stream. Thus the cooling air circulated over the engine is all drawn into the air duct 11 and such air passes over the exhaust pipe 19 and extracts the maximum amount of heat dissipated by the engine and the exhaust system before entering the air duct.

Figure 3:
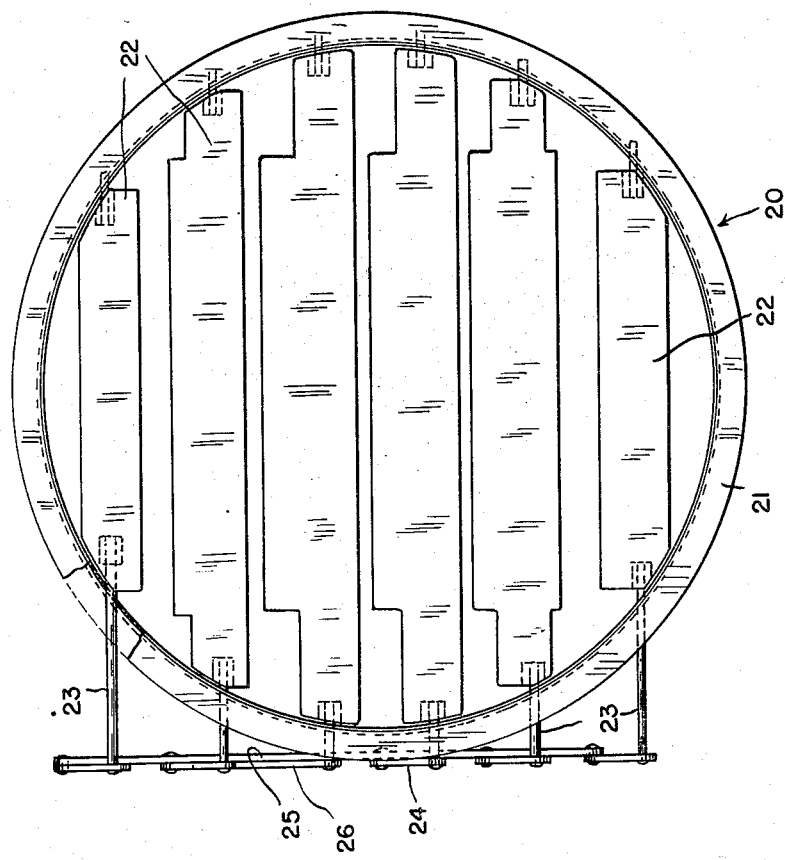
Fig. 3 is an end elevational view of the vanes as constructed for installation in an air duct leading to a crop storage bin or other storage facility.
Figure 4:
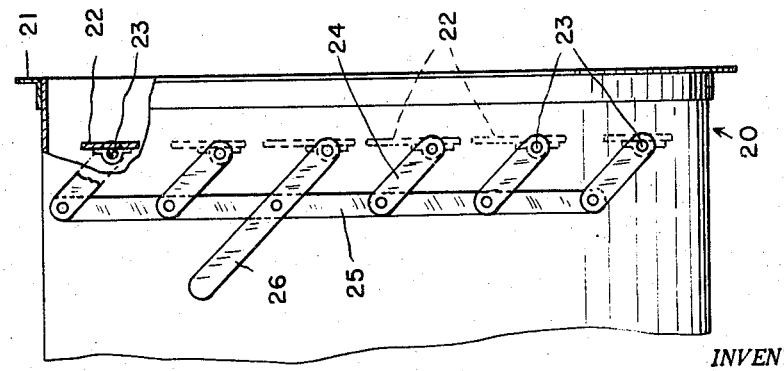
Fig. 4 is an enlarged side elevational view thereof showing the manual control for adjusting the vanes.

The tube axial fan 15 is substantially of the same diameter as the air duct and downstream of this fan I propose to erect a plurality of vanes extending transversely of the air stream. The vane assembly indicated as a whole by reference character 20 comprises a ring or frame 21 on which is rotatably mounted a plurality of vanes 22, each of these vanes connected with shafts 23, which are in turn connected with arms 24, and all of said arms are connected with a bar 25 manually actuated or moved by a handle 26. Thus by moving bar 25 all of said vanes 22 may be adjusted from a closed position as shown in Figs. 3 and 4 to a wide open position. When these vanes are adjusted to a wide open position they offer little or no resistance to flow of air through said air duct, and as they are adjusted towards the closed position, they offer progressively increasing resistance to the air flow through the air duct. To overcome this back pressure or resistance to air flow, the engine is loaded and consequently an excess amount of power is required to move the required amount of air through the air duct against the resistance or back pressure produced by the vanes when adjusted towards the closed position.

While a manual control is adequate in many installations, it is very desirable in some instances, to have an automatic control. Fig. 5 illustrates such a control, 30 represents a humidity and temperature control device of conventional construction, 31 a selector valve, 32 and 33 exhaust valves, and 34 is an actuating cylinder or motor connected in a conventional manner to the bar 25 of the vane assembly 20'.

The automatic control as illustrated in Fig. 5 is designated as a whole in Fig. 1 by reference character C and is preferably electrically connected with humidity and temperature responsive devices 40 located downstream of the blower or fan. One of such devices may be located adjacent the inlet opening of the storage facility and another adjacent the outlet, or elsewhere in the system if so desired, and a switch 41 may be incorporated in the electrical control circuit to control which of said devices 40 are to be used.

Obviously, the automatic operation may be such as to control the adjustment of the vanes in response to many of the physical changes which take place on the down stream side of the system, such as by the temperature of the circulating air, the temperature of the hay, the pressure of the circulating system, the humidity of the outside air or the humidity of the air at the exit of the barn or other drying enclosure.

Another possible modification of the system may comprise the construction of adjustable and controllable propeller blades in the fan. Thus the fan blades 45 may be fixed blades when used with vanes 20 and 20' or may be made adjustable to vary the pitch and thus increase or decrease the back pressure on the engine. Also, if desired, the adjustable vanes or propeller blades can be controlled through suitable controller means which are operated in response to variations of engine manifold vacuum, engine oil pressure or other suitable control means such as an electric motor.

While I have illustrated one system and particularly pointed out and described a manual and automatic operation, it will be apparent to those skilled in the art that various changes in structure, and other modifications may be made therein without departing from the spirit of the invention or from the scope of the appended claims.

I claim:

1. A dehumidifying apparatus of the character described, an air duct, means for moving air through said duct, and comprising an internal combustion engine, a cowling over said engine, an engine exhaust conduit traversing the space about the engine and within the cowling, an impeller driven by said engine and operable to exhaust the air from within the cowling and about said engine to said air duct, and means located downstream from the impeller for impeding air flow to create back pressure on the impeller requiring an excess of power to operate the impeller over the normal power requirements for moving a like column of air through said air duct, said excess power generating heat to be absorbed by the air stream and conducted to the air duct.

2. A dehumidifying apparatus of the character described, an air duct, means for moving air through said duct and comprising an internal combustion engine, a cowling over said engine, an engine exhaust conduit traversing the space about the engine and within the cowling, an impeller driven by said engine and operable to exhaust the air from within the cowling and about said engine to said air duct, said impeller being operable to move a predetermined volume of air to said air duct, and means for excess loading of said impeller, thereby requiring an excess of engine horsepower to maintain a like volume of air flow to said air duct, substantially all of the heat dissipated from said engine being absorbed by the air stream and conducted to the air duct.

3. A dehumidifying apparatus of the character described, an air duct, means for moving air through said duct, and comprising an internal combustion engine, a cowling over said engine, an engine exhaust conduit traversing the space about the engine and within the cowling, an impeller driven by said engine and operable to exhaust the air from within the cowling and about said engine to said air duct, said impeller being operable to move a predetermined volume of air to said air duct, and adjustable means for excess loading of said impeller, thereby requiring an excess of engine horsepower to maintain a like volume of air flow to said air duct, substantially all of the heat dissipated from said engine being absorbed by the air stream and conducted to the air duct.

4. A dehumidifying apparatus of the character described, an air duct, means for moving air through said duct and comprising an internal combustion engine, a cowling over said engine, an engine exhaust conduit traversing the space about the engine and within the cowling, an impeller driven by said engine and operable to exhaust the air from within the cowling and about said engine to said air duct, said impeller being operable to move a predetermined volume of air to said air duct, and adjustable means for excess loading of said impeller, thereby requiring an excess of engine horsepower to maintain a like volume of air flow to said air duct, substantially all of the heat dissipated from said engine being absorbed by the air stream and conducted to the air duct, said adjustable means regulated in response to the temperature requirements downstream from said impeller.

5. In a dehumidifying apparatus of the character described, an air duct, means for moving air through said duct and comprising an internal combustion engine, a cowling over said engine, an engine exhaust conduit traversing the space about the engine and within the cowling, an impeller driven by said engine and operable to exhaust the air from within the cowling and about said engine to said air duct, said impeller being operable to move a predetermined volume of air to said air duct, and adjustable means for excess loading of said impeller, thereby requiring an excess of engine horsepower to maintain a like volume of air flow to said air duct, substantially all of the heat dissipated from said engine being absorbed by the air stream and conducted to the air duct, said adjustable means regulatable in response to temperature requirements downstream from said impeller for selectively imposing a back pressure on the impeller, said excess horsepower utilized to overcome said excess back pressure and to provide an excess of heat for transmission by the air flow to said air duct.

6. In a dehumidifying apparatus of the character described, an air duct, means for moving air through said duct and comprising an internal combustion engine, an impeller driven by said engine and operable to exhaust the air from about said engine to said air duct, said impeller being operable to move a predetermined volume of air to said air duct, and adjustable means for excess loading of said impeller, thereby requiring an excess of engine horsepower to maintain a like volume of air flow to said air duct, substantially all of the heat dissipated from said engine being absorbed by the air stream and conducted to the air duct, said adjustable means comprising a set of vanes mounted downstream of the impeller, means for adjustably mounting said vanes, and means responsive to air flow characteristics downstream of said vanes to actuate said vanes and adjust same to regulate the back pressure on said impeller to maintain substantially constant air characteristics as desired at the point where the heated air is utilized.

7. In a dehumidifying apparatus of the character described, an internal combustion engine having air cooled cylinder and means driven by the engine for circulating cooling air over said engine cylinders, a shroud associated with said engine and collecting substantially all said air after it passes over the engine cylinders, an air duct having an inlet opening adjacent the outlet of said shroud, an impeller in said air duct and driven by said engine, said impeller operable to move a given amount of air through said duct including the heated air from said shroud, and means for excess loading of said impeller, thereby requiring an excess of engine horsepower to maintain a like volume of air flow to said air duct and serving to translate the excess horsepower into heat to be picked up by the air stream conducted to said air duct.

8. In a dehumidifying apparatus of the character described, an internal combustion engine having air cooled cylinders and means driven by the engine for circulating cooling air over said engine cylinders, a shroud associated with said engine and collecting substantially all said air after it passes over the engine cylinder, an air duct having an inlet opening adjacent the outlet of said shroud, an impeller in said air duct and driven by said engine, said impeller operable to move a given amount of air through said duct including the heated air from said shroud, and means for excess loading of said impeller, thereby requiring an excess of engine horsepower to maintain a like volume of air flow to said air duct and serving to translate the excess horsepower into heat to be picked up by the air stream conducted to said air duct, the inlet opening of said air duct serving to take in air from all around said engine, said engine having exhaust connections for carrying away the products of combustion, said exhaust connections comprising exhaust piping extending transverse of the air stream adjacent the inlet opening of said air duct.

9. In a dehumidifying apparatus of the character described, an internal combustion engine having air cooled cylinders and means driven by the engine for circulating cooling air over said engine cylinders, a shroud associated with said engine and collecting substantially all said air after it passes over the engine cylinder, an air duct having an inlet opening adjacent the outlet of said shroud, an impeller in said air duct and driven by said engine, said impeller operable to move a given amount of air through said duct including the heated air from said shroud, and means for excess loading of said impeller, thereby requiring an excess of engine horsepower to maintain a like volume of air flow to said air duct and serving to translate the excess of engine horsepower into heat to be picked up by the air stream conducted to said air duct, the inlet opening of said air duct serving to take in air from all around said engine, said engine having exhaust connections for carrying away the products of combustion, said exhaust connections comprising an annular exhaust ring extending adjacent the inlet opening of said air duct.

10. In a dehumidifying apparatus of the character described, an internal combustion engine having air cooled cylinder and means driven by the engine for circulating cooling air over said engine cylinders, a shroud associated with said engine and collecting substantially all said air after it passes over the engine cylinders, an air duct having an inlet opening adjacent the outlet of said shroud, an impeller in said air duct and driven by said engine, said impeller operable to move a given amount of air through said duct including the heated air from said shroud, and means for excess loading of said impeller, thereby requiring an excess of engine horsepower to maintain a like volume of air flow to said air duct and serving to translate the excess horsepower into heat to be picked up by the air stream conducted to said air duct, said impeller comprising a tube axial fan mounted in said air duct, said means for excess loading the impeller comprising a set of adjustable vanes mounted in the air duct on the downstream side of said tube axial fan, and means for adjusting the position of said vanes to selectively vary the back pressure on said tube axial fan whereby to utilize the full capacity of an engine of excess horsepower and serving to supply an excess amount of heat to the air stream conducted to said duct as compared to the heat dissipated by an engine rated to actuate an unloaded fan of a capacity to meet the normal requirements of said air duct as to volume of air to be moved therethrough.

11. In a dehumidifying apparatus of the character described, an internal combustion engine having air cooled cylinders and means driven by the engine for circulating cooling air over said engine cylinders, a shroud associated with said engine and collecting substantially all said air after it passes over the engine cylinders, an air duct having an inlet opening adjacent the outlet of said shroud, an impeller in said air duct and driven by said engine, said impeller operable to move a given amount of air through said duct including the heated air from said shroud, and means for excess loading of said impeller, thereby requiring an excess of engine horsepower to maintain a like volume of air flow to said air duct and serving to translate the excess horsepower into heat to be picked up by the air stream conducted to said air duct, said impeller comprising a tube axial fan mounted on said air duct, said means for excess loading the impeller comprising a set of adjustable vanes mounted in the air duct on the downstream side of said tube axial fan, and means for adjusting the position of said vanes to selectively vary the back pressure on said tube axial fan whereby to utilize the full capacity of an engine of excess horsepower and serving to supply an excess amount of heat to the air stream conducted to said duct as compared to the heat dissipated by an engine rated to actuate unloaded fan of a capacity to meet the normal requirements of said air duct as to volume of air to be moved therethrough, said vanes adjustable in accordance with the physical characteristics of the air stream to be exhausted from said air duct.

12. In a dehumidifying apparatus of the character described, an internal combustion engine having air cooled cylinder and means driven by the engine for circulating cooling air over said engine cylinders, a shroud associated with said engine and collecting substantially all said air after it passes over the engine cylinders, an air duct having an inlet opening adjacent the outlet of said shroud, an impeller in said air duct and driven by said engine, said impeller operable to move a given amount of air through said duct including the heated air from said shroud, and means for excess loading of said impeller, thereby requiring an excess of engine horsepower to maintain a like volume of air flow to said air duct and serving to translate the excess horsepower into heat to be picked up by the air stream conducted to said air duct, said impeller comprising a tube axial fan mounted in said air duct, said means for excess loading the impeller comprising a set of adjustable vanes mounted in the air duct on the downstream side of said tube axial fan, and means for adjusting the position of said vanes to selectively vary the back pressure on said tube axial fan whereby to utilize the full capacity of an engine of excess horsepower and serving to supply an excess amount of heat to the air stream conducted to said duct as compared to the heat dissipated by an engine rated to actuate an unloaded fan of a capacity to meet the normal requirements of said air duct as to volume of air to be moved therethrough, said vane adjusting means operable in response to temperature changes downstream of the fan to adjust said vanes.

13. A method of producing heated air of sufficient volume to dry hay and other similar produce enclosed in a barn or other similar storage facility consisting in blowing air through a conduit to the storage facility where same is to be used, in powering said blower by an internal combustion engine having excess horsepower available over that required to move an adequate amount of air to effect the desired drying of the produce in said storage facility, in initially passing at least some of the air in heat exchange relation with said engine to heat the air, and in impeding the flow of such air through said conduit to build up back pressure whereby to cause the engine to operate under heavy load in overcoming the back pressure and thereby using such excess horsepower to provide an adequate amount of heat to the air conducted to said storage facility.

PETER ALTMAN.

REFERENCES CITED

The following references are of record in the file of this patent:

UNITED STATES PATENTS

| Number | Name | Date |
| --- | --- | --- |
| 844,627 | Sylvester | Feb. 19, 1907 |
| 1,658,775 | Campbell | Feb. 7, 1928 |
| 2,200,379 | Williams | May 14, 1940 |
| 2,425,000 | Paget | Aug. 5, 1947 |
| 2,437,899 | Welty | Mar. 16, 1948 |